April 29, 1958 R. F. OSTER ET AL 2,832,487
STEEL PALLET AND HANDLING ATTACHMENT THEREFOR
Filed Aug. 3, 1955 5 Sheets-Sheet 1
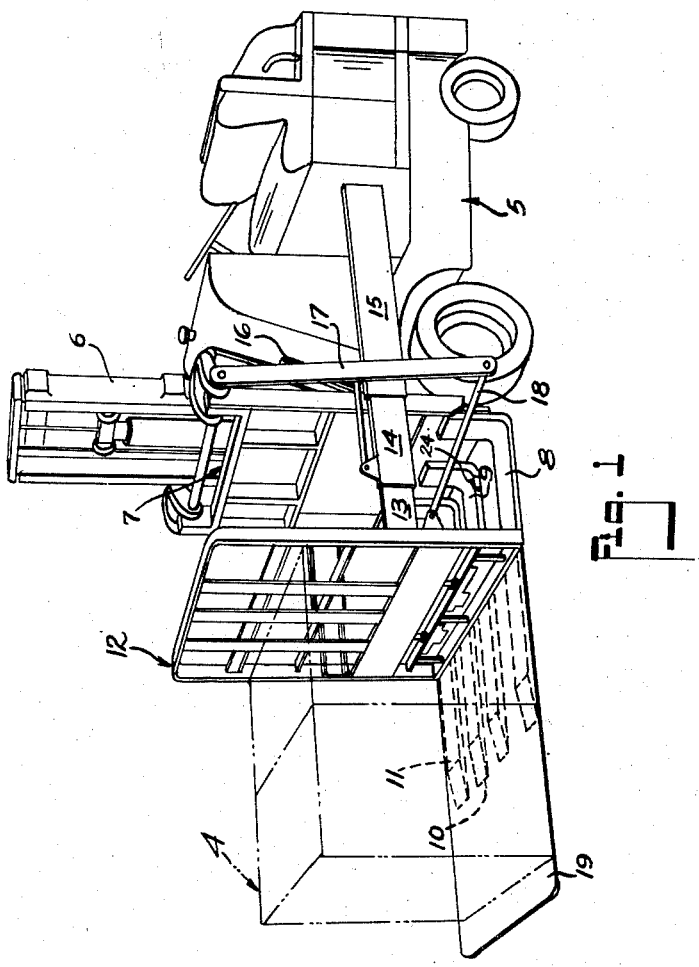
INVENTORS
ROBERT F. OSTER
& JOHN. J. HAFFER.
BY
RICHEY, WATTS, EDGERTON & McNENNY
ATTORNEYS

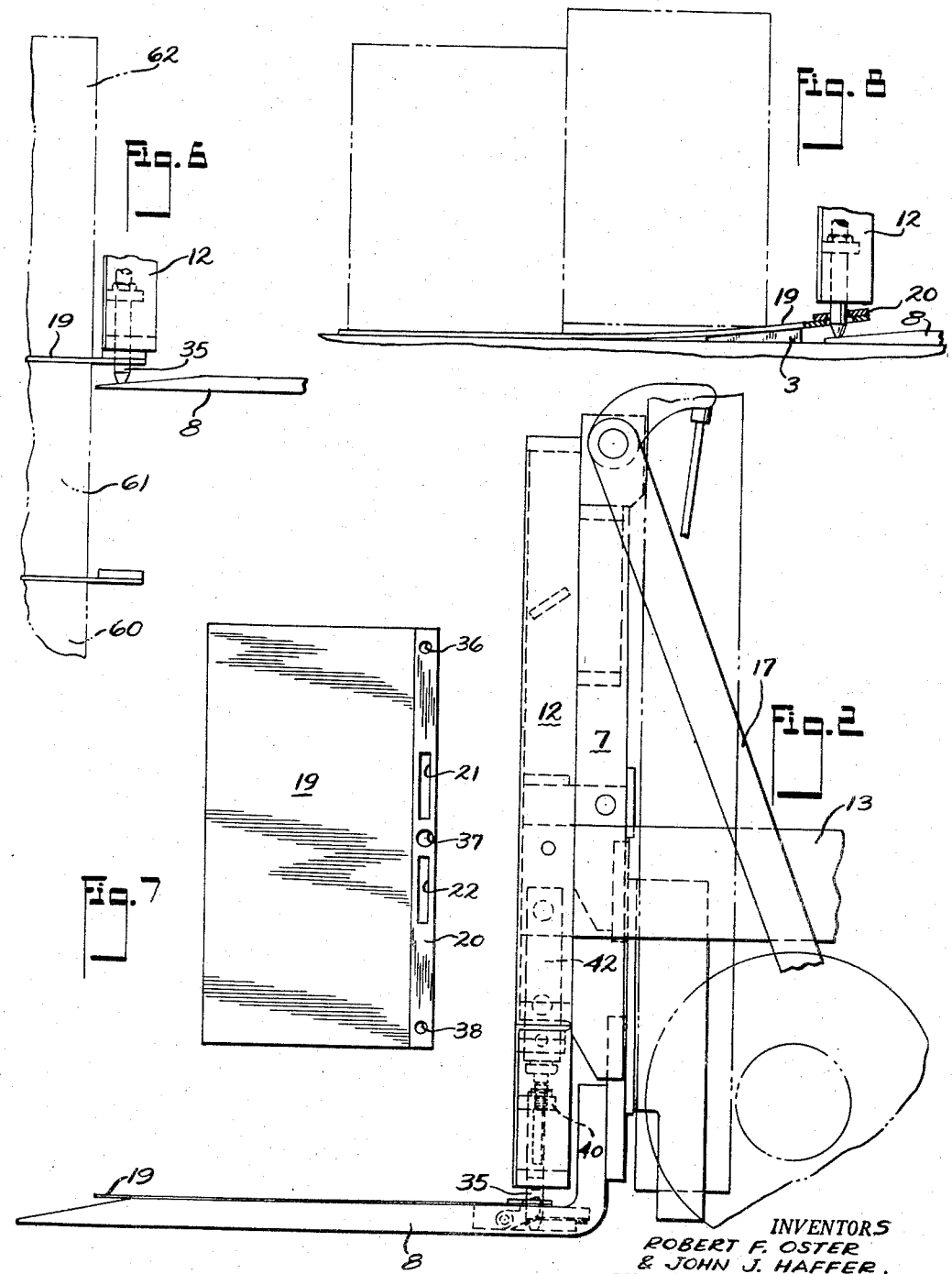

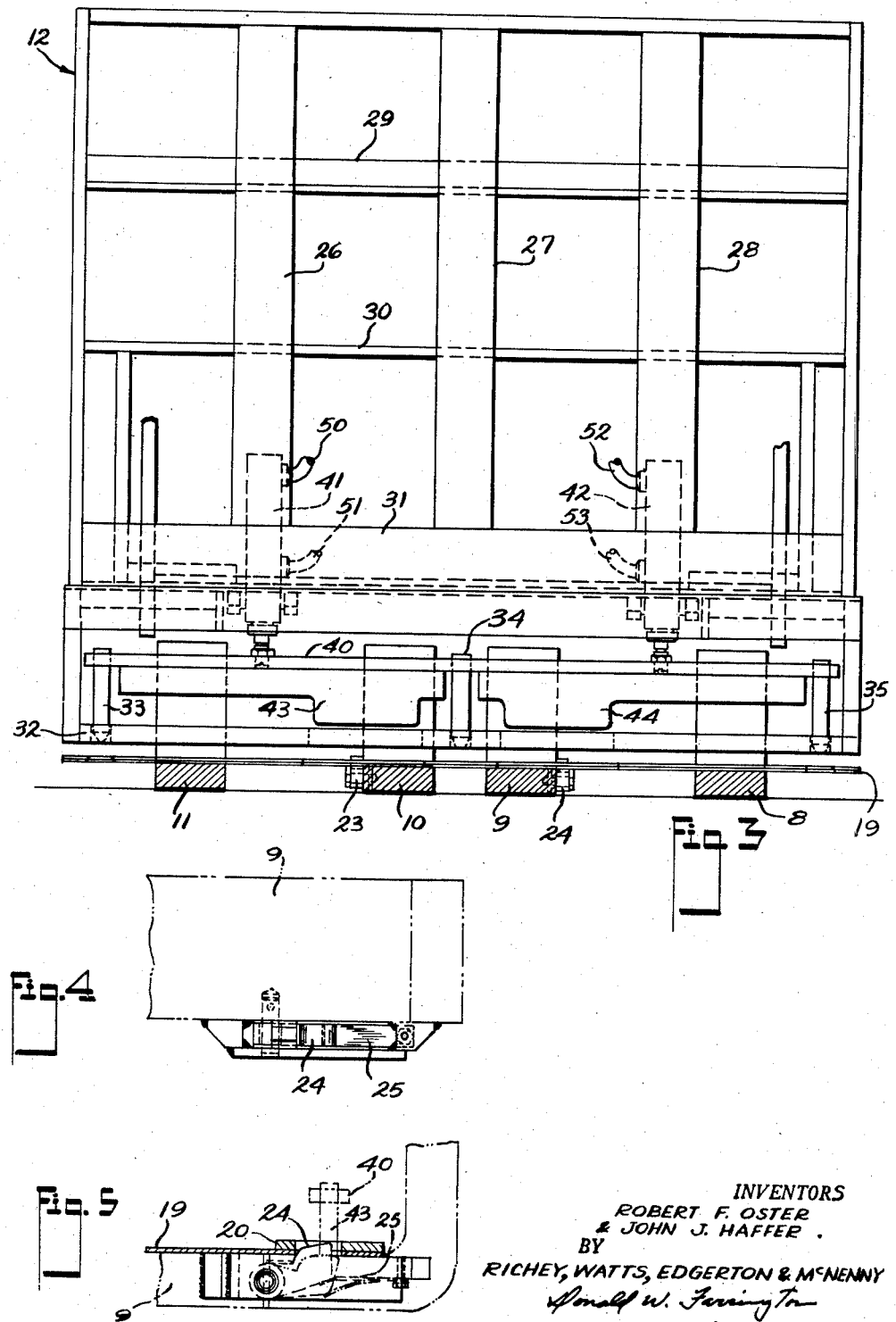

April 29, 1958 R. F. OSTER ET AL 2,832,487
STEEL PALLET AND HANDLING ATTACHMENT THEREFOR
Filed Aug. 3, 1955 5 Sheets-Sheet 4
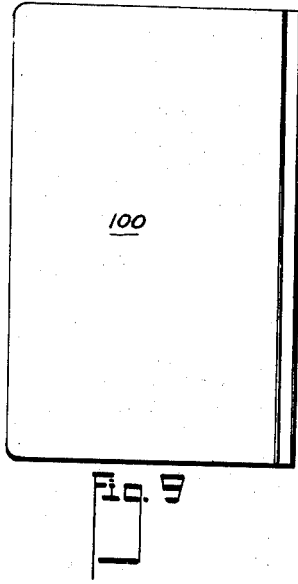
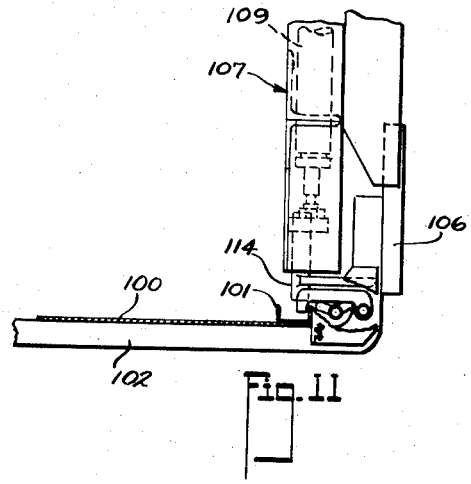
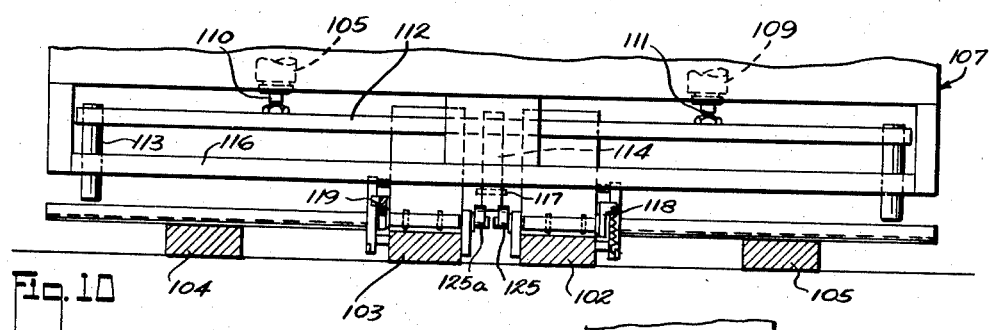
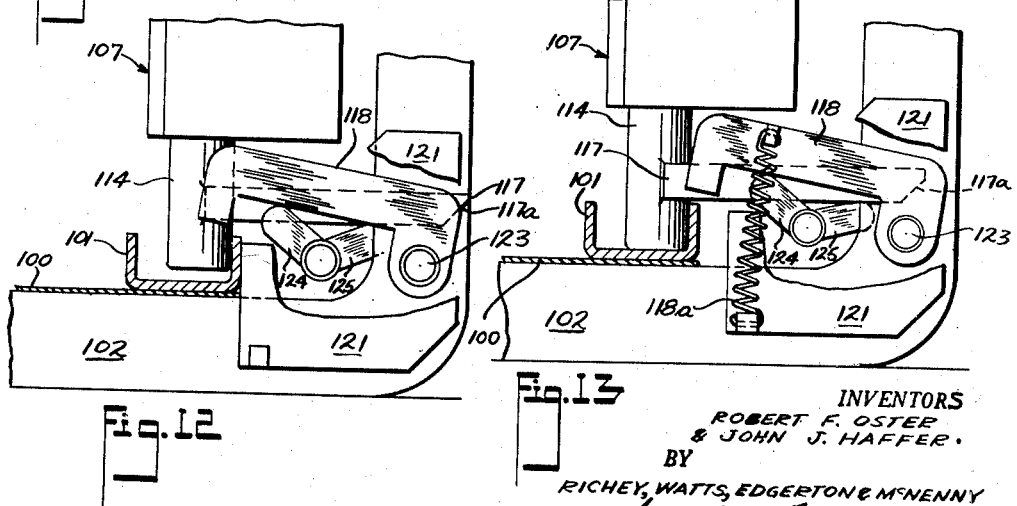
INVENTORS
ROBERT F. OSTER
& JOHN J. HAFFER.
BY
RICHEY, WATTS, EDGERTON & McNENNY
Donald W. Farrington
ATTORNEYS

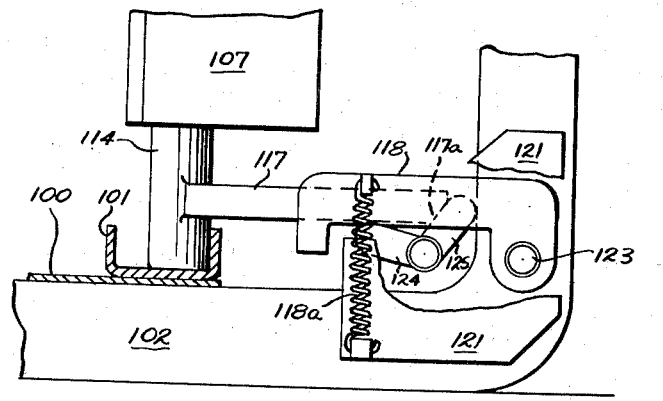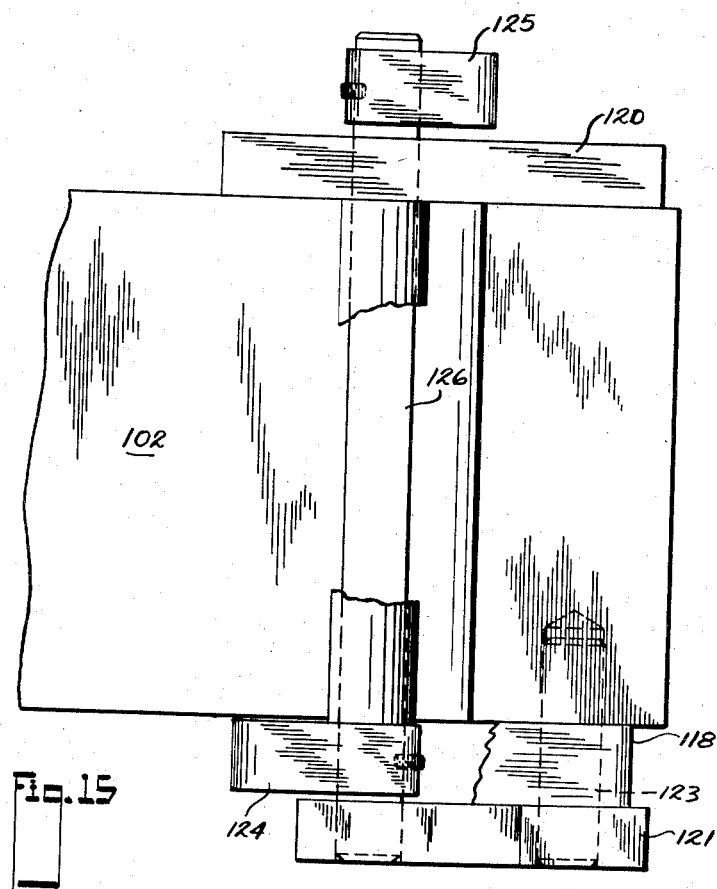

_United States Patent Office_

2,832,487
Patented Apr. 29, 1958

2,832,487
STEEL PALLET AND HANDLING ATTACHMENT THEREFOR

Robert F. Oster, Fairview Park, and John J. Haffer, Euclid, Ohio, assignors to Towmotor Corporation, Cleveland, Ohio, a corporation of Ohio Application August 3, 1955, Serial No. 526,283

11 Claims. (Cl. 214—514)

The present invention relates to material handling and more particularly to an industrial lift truck and a pallet handling attachment for a lift truck.

Numerous expedients have been employed for loading, unloading and load manipulation for industrial lift trucks including the use of pallets designed to facilitate the handling of a load on a pallet. Some of such prior efforts have included wooden pallets with supporting frames to facilitate the insertion of the fork on the lift truck and other proposals have included the use of heavy paper pallets with gripping devices carried by a pusher to grip the edge of a paper pallet and pull the loaded pallet on to the lift fork of the truck. According to the present invention a sheet steel pallet is provided and one edge of the pallet is constructed and arranged to cooperate with pallet handling devices carried by the pusher and fork on the lift truck. The lift truck, according to the present invention, is provided with a pusher attachment mounted for reciprocation similar to the pushing devices disclosed in the patent to D. M. Palm No. 2,418,661 and in the patent to D. Wessman No. 2,496,079.

Two forms of our invention are disclosed in the instant application and it will be found as the description proceeds that there is substantial identity in the structure, mode of operation and results obtained by the two forms of the invention. Both forms of the device are to be used with a lift truck having a fork and a horizontally reciprocating pusher with spring-pressed latch means on the fork to engage the pallet, and means carried by the pusher to release the fork latch and at the same time engage the pallet.

It is among the objects of our invention to provide a pallet and lift truck wherein the pallet may be selectively latched to the lift truck fork while the load is being pushed off of the pallet or the latch released and the pallet and load moved off of the truck fork as a unit.

It is a further object of our invention to provide a steel pallet having a reinforcing member along one edge constructed and arranged so that the pallet may be latched along said edge to a lift truck fork or may be moved longitudinally of the fork by interengaging means on the pallet and a pusher carried by the lift truck.

It is a further object of our invention to provide a sheet steel pallet having a reinforcing channel along one edge thereof wherein the channel is open upwardly to receive either latch means carried by the fork of the lift truck or pallet-moving means carried by the pusher of the lift truck.

It is also among the objects of our invention to provide a sheet steel pallet having openings along one edge thereof and a lift truck having a fork and pusher with means selectively operable for projection through the openings in the pallet whereby the pallet may be efficiently loaded and unloaded and an improved material handling operation thereby effected.

It is a further object of our invention to provide a lift truck having a fork and a pusher wherein the fork is provided with a latch to engage the pallet and the pusher is provided with latch-operating means and pallet-engaging means.

It is a further object of our invention to provide a lift truck according to the preceding objects wherein a fork is provided with a spring-pressed latch to engage the pallet when the pallet is fully supported by the fork and wherein the pusher is provided with means under the control of the operator to unlatch the pallet with respect to the fork and simultaneously couple the pallet to the pusher.

Further objects and advantages relating to efficiency in operation, simplicity in construction and convenience of use, will appear from the following description and the appended drawings, wherein Fig. 1 is a perspective view of a lift truck provided with a pallet-handling attachment according to the present invention;

Fig. 2 is an elevation showing the pallet in supported position on the fork and the pusher provided with pallet-engaging means according to the present invention;

Fig. 3 is an elevation showing the pallet-latching mechanism and the parts carried by the pusher arranged for latch actuation and engagement with the pallet;

Fig. 4 is a plan view of one of the pallet latches as mounted on the fork of the lift truck;

Fig. 5 is an elevation of the latch showing the latch in engagement with the pallet and showing the latch disengaged with respect to the pallet in dotted outline;

Fig. 6 is an elevation with parts broken away showing the relative position of the fork, the pallet and the pallet-engaging means carried by the pusher illustrating the manner in which a load may be removed from a stack of pallet loads;

Fig. 7 is a plan view of that form of pallet used with the pallet-handling apparatus of Figs. 1 to 6 and Fig. 8;

Fig. 8 is an elevation with parts broken away to illustrate the pick up of a loaded pallet on the floor;

Fig. 9 is a plan view of the pallet of a modified form of our invention wherein the pallet sheet is provided with a channel secured along one edge thereof;

Fig. 10 is an end elevation with parts in section showing the modification of the fork and pusher constructed and arranged to be used with the steel pallet shown in Fig. 9;

Fig. 11 is a side elevation with parts in section of the modified form of our invention showing the pallet in latched position on the fork;

Fig. 12 is an enlarged detailed showing of the modification with parts broken away illustrating the latching mechanism for the pallet of Fig. 9;

Fig. 13 is a view similar to Fig. 12 showing the pallet as moved from its latched position;

Fig. 14 is a view similar to Figs. 12 and 13 showing the pallet as moved a substantial distance from the latch permitting the pallet latch to be restored to latched position; and Fig. 15 is an enlarged detailed plan showing portions of the latch mechanism carried by the fork.

According to the first form of the present invention a lift truck of the type employing an elevating mast, a carriage mounted for vertical reciprocation on the mast and a pusher is utilized. The carriage is provided with the fork attachment comprising spaced fork elements and the pusher is arranged to be reciprocated longitudinally of the fork and a sheet pallet having openings along one edge is arranged to be secured in supported position on the fork or to be released therefrom and be manipulated by the pusher.

Referring to the drawings, the lift truck indicated at 5 is provided with a vertically disposed mast 6 upon which is mounted a carriage 7. The lower portion of the carriage 7 is provided with a fork comprising a plurality of spaced fork members 8, 9, 10 and 11. The carriage is also provided with a pusher assembly indicated in its entirety as at 12 which is supported to be reciprocated longitudinally of the fork by means of the telescopic channel members 13, 14 and 15. A double-acting hydraulic cylinder 16 is employed to rock the lever 17 which through link 18 moves the pusher 12 longitudinally with respect to the fork. Reference is made to said Palm Patent No. 2,418,661 and said Wessman Patent No. 2,469,079 for a more detailed description of the mechanism preferred for moving the pusher.

A steel pallet 19 is arranged to be moved on and off the fork assembly and is shown as supporting a load 4 in partially advanced position in Fig. 1. The pallet as shown in plan view in Fig. 7 has welded thereto along one edge a bar 20 and the pallet and bar are apertured as at 21 and 22 to receive latches 23 and 24 respectively carried by fork members 10 and 9 respectively. The latch members 23 and 24 are pivoted to the fork members and are normally urged in a counterclockwise direction (as shown in Fig. 5) by a flat leaf spring 25. The upper surface of the pivoted latches 23 and 24 is provided with an inclined or cam face so arranged that when the pallet is moved along the fork toward the carriage the latch is turned downwardly or in a clockwise direction about its pivot until the latch is free to spring upwardly into the opening 21 or 22 of the pallet. The face of the latch adjacent to the carriage presents a vertical surface engaging the opening in the pallet 22 so as to normally prevent withdrawal of the pallet 19 after it is in its supported position as shown in Figs. 2 and 5.

The pusher assembly 12 comprises a rectangular frame work with vertical cross pieces 26, 27 and 28 and transverse cross members 29, 30 and 31. The lowermost horizontal frame member 32 of the pusher 12 is provided with three spaced openings to receive and guide vertically reciprocating pallet pins 33, 34 and 35. The pallet 19 is similarly apertured as at 36, 37 and 38 to receive said pallet pins. A control bar 40 is arranged transversely of the pusher adjacent the lower edge of the pusher frame and the bar 40 is adapted to be moved vertically with respect to the frame 12 by a pair of double-acting hydraulic cylinders 41 and 42. The pallet pins 33, 34 and 35 are each anchored at their upper ends to the control bar 40. The control bar is provided with depending latch control elements 43 and 44 which are proportioned so as to pass through the openings 21 and 22 respectively in the pallet. When the control bar 40 is lowered as shown in Fig. 5, the elements 43 and 44 will depress the latches 23 and 24 respectively. The pins 33, 34 and 35 carried by the control bar 40 are also lowered by the bar 40 so as to enter the openings 36, 37 and 38 respectively in the pallet 19.

Hydraulic fluid under pressure is adapted to be directed into the upper end of the cylinder 41 through line 50 so as to lower the control bar 40 or through line 51 at the lower end of the cylinder for raising the control bar 40. Such hydraulic fluid may be selectively directed by means of a valve convenient to the operator of the vehicle. A similar arrangement is provided through lines 52 and 53 for the hydraulic cylinder 42 and a single control valve operates the cylinders 41 and 42 in unison.

As shown in Fig. 8 that edge of the pallet 19 provided with the reinforcing bar 20 is supported on wedges such as at 3 and the major portion of the pallet rests on the floor. The loaded pallet may be pulled on to the fork construction by advancing the pusher away from the carriage so that the pusher 12 is disposed over the apertured edge of the pallet 19. The hydraulic cylinders 41 and 42 are actuated by the operator admitting fluid through lines 50 and 52 to lower the pallet pins and project them downwardly through the apertures 36, 37 and 38 of the pallet. Then the pusher may be retracted by the hydraulic cylinder 16 so as to pull the loaded pallet back on to the fork to position the pallet as shown in Fig. 2. When thus positioned the control bar 40 may be raised by admitting hydraulic fluid through lines 51 and 53 of cylinders 41 and 42 so as to raise the control bar and withdraw the pins from the openings in the pallet. Alternatively, the entire vehicle may be advanced with respect to a loaded pallet so that the fork is advanced beneath the load and as the openings 21 and 22 of the pallet traverse the spring-pressed latches 23 and 24 carried by the fork said latches will spring upwardly and engage and hold the pallet in the position shown in Fig. 2. Thus a loaded pallet may be positioned on the fork either by advancing the pusher and lowering the pins and then retracting the pusher or by moving the fork beneath the load until a pallet snaps into latched position on the fork.

In removing the load from the vehicle the control bar 40 may be lowered which depresses the latches 23 and 24 and at the same time lowers the pins 33, 34 and 35 through the corresponding openings in the pallet. Then the pusher is advanced pushing both the load and pallet off of the fork. In this operation it will be understood that the control elements 43 and 44 in their lowered position project into the openings 21 and 22 of the pallet and thus co-operate with the pins in advancing the pallet and the load off the fork. Alternatively the load may be pushed off and the pallet retained on the fork by actuating the pusher without lowering the control bar 40.

When it is desired to take loads from a vertical stack where each of the loads is supported by a pallet as illustrated in Fig. 6, the vehicle may be advanced to the vertical stack of loads such as 60, 61 and 62 so that the end of the fork as indicated at 8 is against the load 61 immediately beneath the pallet 19 supporting the top load 62. The pusher 12 is advanced to overhang the edge of the pallet 19 and the pins are lowered into the pallet openings. Now the pusher 12 may be retracted and pull the load 62 back towards the carriage into fully supported position on the fork. During this retracting operation the ends of the fork members are stationary and the vehicle is stationary so that the loads beneath the top load are prevented from moving toward the lift truck. Thus the stack is stabilized by the end of the fork being in contact with the load immediately beneath the load which is being moved back on to the fork.

In that form of our invention illustrated in Figs. 9 to 15 inclusive a steel pallet 100 has secured along one edge thereof a channel section 101. The channel 101 is secured to the sheet 100 by welding the web of the channel to the top of the sheet so that the vertically disposed flanges of the channel may be utilized to engage means carried by the pusher and a latch carried by the fork. The fork members 102, 103, 104 and 105 are secured to the fork lift carriage 106 substantially as in the form first above described. The lift truck is provided with a pusher indicated in its entirety as at 107 which is equipped with actuating cylinders 108 and 109 having piston rods 110 and 111 secured to the vertically movable control bar 112. Pusher pins 113, 114 and 115 are secured to the control bar 112 and are reciprocated thereby through openings in the lower frame member 116 of the pusher. The pusher pins are shown in Figs. 10 and 11 in their upper or raised position and are shown in Figs. 13 and 14 in their lower position. The centrally disposed pusher pin 114 is provided with a horizontally disposed latch-operating member 117 which is adapted to engage and operate pallet-latching means carried by the fork.

The pallet-latching means is arranged to function substantially as the pallet-latching means in the form first described in that when the pallet is pulled back onto the fork the pallet latch carried by the fork is biased against a spring to open the latch so as to permit the full retraction of the pallet and thereafter permits the latch to engage the rear edge of the pallet so as to prevent movement of the pallet forwardly with respect to the fork. In the modified form of the invention two spring-pressed pivoted latches 118 and 119 are provided. The latch assembly for the latch 118 is mounted on the fork element 102 and the latch assembly for the latch 119 is mounted on the fork element 103. The latch assembly as illustrated in the enlarged showing of Fig. 15 includes a mounting plate 120 secured on one side of the fork 102 and a second mounting plate 121 secured at the other side of the fork element 102 in spaced relation so as to provide a pivotal mounting as at 123 for the pivoted latch 118. The latch hook 118 is shown as broken away in Fig. 15 so as to illustrate the latch operating cams 124 and 125.

The latch-operating cams 124 and 125 are fixed to a shaft 126 mounted for free rotation in the plates 120 and 121 at opposite sides of the fork. The cams are secured to the shaft at an angle with respect to each other of a little more than 90° and the cams are on opposite sides of the vertical plane through the axis of the shaft 126 so that when the cam 125 is pushed downwardly it will rotate the shaft 126 and the other cam 124 will be raised so as to bear against the underside of the latch 118. It will be noted by reference to Fig. 10 that the cams 125 and 125a are disposed beneath the member 117 carried by the center pushing pin 114 so that when the pusher pins are lowered the member 117 will be lowered to rock the cams 125 and 125a downwardly and thus raise the latches 118 and 119. The member 117 has a cam face 117a at its outer end so that when the pallet 100 is being pulled onto the fork as illustrated in Fig. 14 the cam face 117a will engage the cam 125 and raise the latch 118 so as to clear the rear edge of the channel 101. Thus the channel may be pulled back on the fork to the position shown in Fig. 11 and the pusher pins raised so that the latch will be biased downwardly by the latch spring 118a. The operating mechanism for the latch 119 is constructed and arranged substantially as described in connection with the latch 118. It will be noted from Fig. 10 that the latch assembly for latch 119 is a left-hand mounting so that the cam 125a for the latch 119 is adjacent the cam 125 for the latch 118. Thus the two cams 125 and 125a are both actuated at the same time by the member 117 carried by the pusher pin 114.

In using the form of our invention illustrated in Figs. 9 to 15 inclusive it will be understood that the pusher pins 113, 114 and 115 may be lowered into the pallet channel 101 at any desired location along the channel 101 so that it is unnecessary for the operator to obtain an exact alignment between the pallet and the fork. This form of the invention presents a similar advantage with respect to the latches 118 and 119 which may engage the channel 101 at any point along its length. Thus the channel 101 provides a wide "target" for the pusher pins and pallet latches.

When it is desired to pull a loaded pallet onto the fork the pusher assembly 107 is advanced to a position over the channel 101 and the pusher pins lowered. The pusher is then retracted toward the carriage with the pins in their lowered position as determined by the actuation of the hydraulic cylinders 108 and 109. As the loaded pallet approaches the carriage the parts will assume the position illustrated in Fig. 14 where the cam face 117a of the member 117 is about to engage the cam 125. As the retracting movement of the pusher is continued the parts will assume the position shown in Fig. 13 where the cam 125 has been depressed and the cam 124 by bearing against the underside of the latch 118 has raised the latch sufficiently to permit the rear edge of the channel 101 to move rearwardly beneath the latch hook 118. This condition of the parts is maintained as long as the pusher pins are in their lowered position during retraction. When the loaded pallet is fully retracted, the pusher pins may be raised as shown in Fig. 11 with the result that the latches 118 and 119 are moved to their latched positions by the latch springs.

It will be understood that with a loaded pallet in the position of Fig. 11 the pusher 107 may be advanced without lowering the pusher pins. The latch hooks 118 and 119 are thus effective to hold the pallet on the fork with the result that the load may be pushed off of the pallet and off of the fork leaving the pallet in its latched position on the fork. Alternatively, the lift truck operator may lower the pusher pins which will, as above described, release the latch hooks 118 and 119. The pins being in their lowered position engage the channel 101 and thus move the loaded pallet off of the fork. This form of invention is well suited to the removal of a pallet and it is loaded from the top of a stack substantially as described in connection with the first form of our invention. The pallet 100 is shown as being made by welding the channel 101 to the sheet but those skilled in the art will appreciate that the sheet stock can be formed along one edge to provide a channel shape equivalent to that illustrated.

Although we have shown and described two forms of our invention in considerable detail, it will be understood that numerous modifications may be made therein without departing from the scope of the invention as defined in the following claims.

What is claimed is:

1. In combination a lift truck having a carriage, a fork supported by the carriage, a pusher mounted on the carriage for reciprocation with respect to the fork, a steel pallet having apertures along one edge thereof on said fork, pivoted latch means mounted on the fork, said latch means being spring biased to project upwardly through one of said apertures, vertically reciprocable means carried by said pusher, said last-named means aligned with said latch and proportioned to project through said aperture in said pallet to move said latch means downwardly out of said apertures.

2. In combination a lift truck having a carriage, a fork supported by the carriage, a pusher mounted on the carriage for reciprocation with respect to the fork, a steel pallet having a plurality of apertures along one edge thereof, a plurality of spring biased pivoted latches mounted on the fork, vertically reciprocable means carried by said pusher, said last-named means aligned with said apertures and latches and proportioned to project down through the apertures in said pallet to depress said latch and engage the pallet.

3. A lift truck having a carriage, a load support projecting from the carriage, a pusher mounted on the carriage for advancing and retracting movement with respect to the load support, a hydraulic cylinder carried by the pusher, pallet pins mounted for vertical movement on the pusher and means operably connecting the cylinder to said pallet pins, a spring biased pallet latch carried by the load support and latch operating means carried by the pusher, said latch operating means being operably connected to said hydraulic cylinder to be actuated simultaneously with said pallet pins.

4. In combination a lift truck carriage having horizontally disposed fork members projecting horizontally from the carriage, latch means pivoted on the fork members normally biased to project upwardly above the horizontal surface of the fork members, a steel pallet provided with apertures along one edge thereof adapted to be aligned with said latch means, a pusher mounted on the carriage for longitudinal movement, vertically reciprocating means mounted on the pusher aligned with said apertures and arranged to be lowered through the apertures in the pallet to depress said latch and engage the pallet for movement with the pusher.

5. In combination a lift truck carriage having horizontally disposed fork members projecting from the carriage, a latch pivoted on the fork and normally biased to project upwardly above the surface of the fork, a steel pallet having a latch opening at one edge thereof and adapted to be aligned vertically with said latch, said latch normally restraining the pallet against movement away from the carriage, a pusher mounted on the carriage for longitudinal movement, a vertically reciprocating member mounted on the pusher, a portion of said reciprocating member arranged to be lowered through said latch opening in the pallet to depress said latch to release the pallet with respect to the fork and engage the pallet for movement with the pusher.

6. In combination a lift truck having a fork, a pusher carried by the truck mounted for horizontal reciprocation above the fork, hydraulic cylinder actuated means carried by the pusher, a spring-pressed pallet latch mounted on the fork, a control bar mounted on the pusher for vertical reciprocation between upper and lower positions, means operatively connecting the control bar to said actuating means to be moved to said positions thereby, a flat pallet sheet having a rigid member along one edge of the sheet, interengaging means on said control bar and said member whereby said pallet may be moved along the fork by the pusher when the control bar is in said lower position, and latch engaging means carried by the control bar to release said pallet latch when the bar is in said lower position.

7. In combination a lift truck having a fork, a sheet steel pallet having a rigid reinforcing member secured to the top of the sheet along one edge thereof, said fork being provided with a pallet latch adapted to engage said member when the pallet is fully retracted on the fork, a pusher mounted on the truck for horizontal reciprocation above the fork, movable means carried by the pusher for engaging said pallet member and releasing said latch, and an actuator carried by the pusher to lower said movable means to effect pallet engagement and latch release.

8. In combination a lift truck carriage having a fork, a pusher mounted on the lift truck for horizontal reciprocation toward and away from the carriage above the fork, vertically movable means carried by the pusher, a pallet latch pivoted on the fork adjacent the carriage, a flat steel pallet having a channel along one edge thereof with the flanges projecting upwardly from the top of the pallet, a pallet mover carried by the said means on the pusher moved downwardly therewith to engage said channel for movement of the pallet by the pusher and a latch operator carried by the said means on the pusher moved downwardly therewith to release said latch with respect to the pallet when the control bar is in said lower position and the pusher is retracted to the carriage.

9. In combination a lift truck having a fork, a pusher carried by the truck mounted for horizontal reciprocation above the fork, hydraulic means mounted on the pusher, a spring-pressed pallet latch pivoted on the fork, a control bar mounted on the pusher for vertical reciprocation between upper and lower positions, means operatively connecting the control bar to said hydraulic means to be moved to said positions thereby, a flat pallet sheet having a channel member along one edge of the sheet, interengaging means on said control bar and said channel whereby said pallet may be moved along the fork by the pusher when the control bar is in said lower position, and latch operating means carried by the control bar to release said pallet latch when the pallet is retracted on the fork while the control bar is in said lower position.

10. In combination a lift truck having a fork, a sheet steel pallet having a rigid reinforcing member on the top of the sheet along one edge thereof, said fork being provided with a pivoted pallet latch adapted to engage said member when the pallet is supported on the fork in retracted position, a pusher mounted on the truck for horizontal reciprocation above the fork, means carried by the pusher for engaging said pallet and releasing said latch when the pusher is in retracted position and an actuator carried by the pusher to engage said means to effect pallet engagement and latch release.

11. In combination a lift truck having a fork, a pusher mounted on the lift truck for horizontal reciprocation above the fork, vertically movable hydraulic actuating means carried by the pusher, a pallet latch carried by the fork, a vertically movable control bar mounted on the pusher, means operatively connecting the control bar with said actuating means whereby the control bar may be moved to upper and lower positions, a flat steel pallet having a channel along one edge thereof with the flanges projecting upwardly from the top of the pallet, a first means carried by the control bar and moved downwardly therewith to engage said channel for movement of the pallet by the pusher, a second means carried by the control bar and moved downwardly therewith to release said latch with respect to the pallet when the control bar is in said lower position.

References Cited in the file of this patent
UNITED STATES PATENTS

| | | |
|---|---|---|
| 2,117,067 | Ludington | May 10, 1938 |
| 2,424,429 | Bamberg | July 22, 1947 |
| 2,619,241 | Jessen | Nov. 25, 1952 |
| 2,681,198 | Gleaves | June 15, 1954 |
| 2,707,573 | Balwics | May 3, 1955 |